March 15, 1966     W. D. VOELKER     3,240,855
FLUFFING FOAM
Filed Nov. 16, 1962
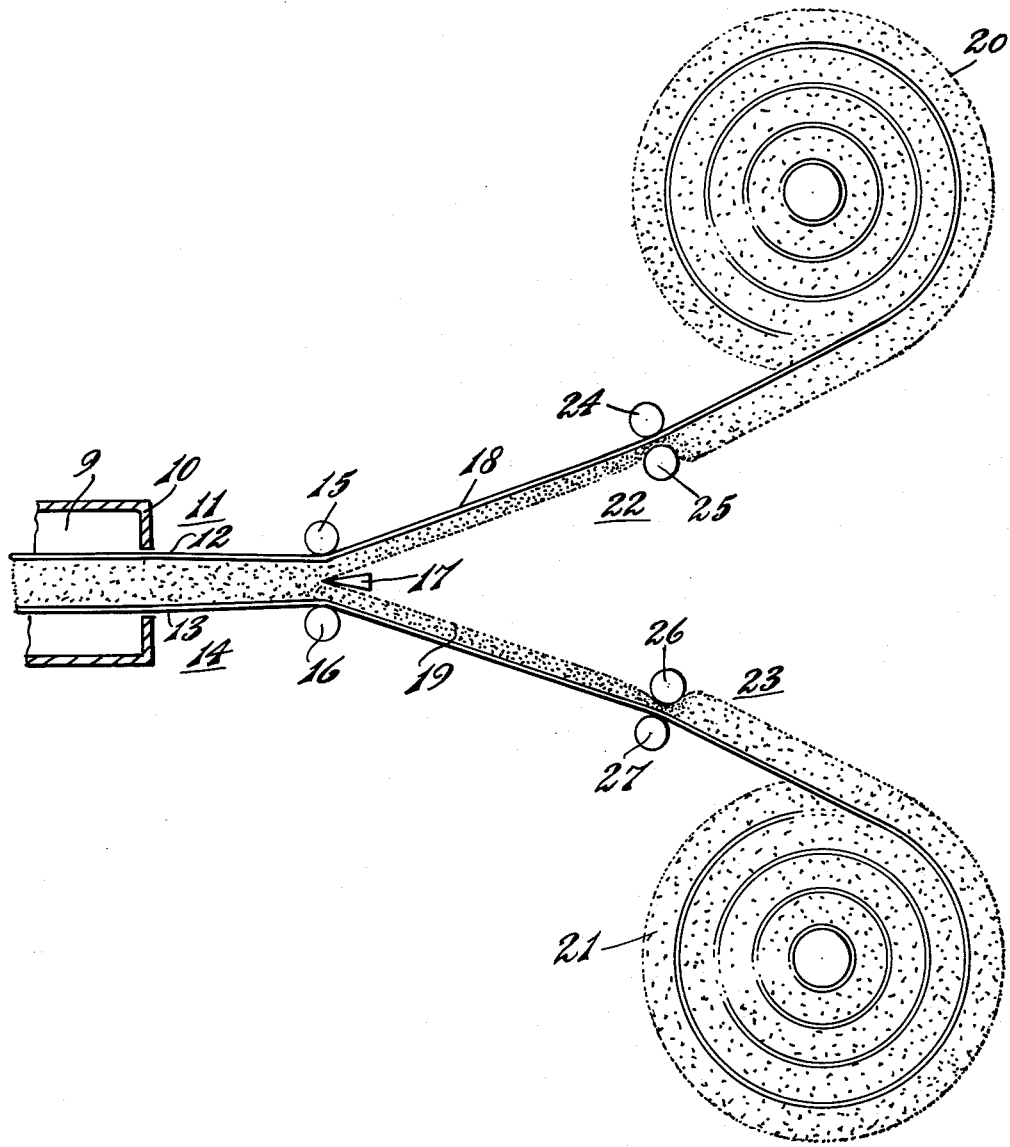
INVENTOR
Walter D. Voelker
BY John R. Ewbank
ATTORNEY

United States Patent Office 3,240,855
Patented Mar. 15, 1966

3,240,855
FLUFFING FOAM
Walter D. Voelker, Philadelphia, Pa., assignor, by mesne assignments, to Allied Chemical Corporation, New York, N.Y., a corporation of New York
Filed Nov. 16, 1962, Ser. No. 238,169
1 Claim. (Cl. 264—321)

This invention relates to polyurethane foam and particularly to a method of fluffing a thin strip of flexible foam into a product having lighter density and good resilient properties.

Heretofore there have been machines for the production of continuous strips of polyurethane foam. In some such devices, a splitter serves to cut the strip into a plurality of thinner strips of flexible polyurethane foam. There is a considerable demand for multilayer structures comprising a flexible backing sheet and a layer of flexible polyurethane foam. Such sheet backed foam strips have been manufactured by preparing a sandwich and thereafter splitting the core of the sandwich.

In accordance with the present invention a flexible polyurethane foam strip is transformed into a fluffier, lower density polyurethane foam strip by a method in which the strip is advanced between rollers and subjected to compression while the freshly slit surface is in contact with a roller moving at a peripheral speed significantly greater than the speed of advancement of the strip. It is believed that the freshly slit surface of the polyurethane foam has a tendency toward adhering to the surface of a roller compressed thereagainst, and that the tendency toward adhesion cooperates to impart a stretching force to the foam so that the high speed roller pulls and stretches and fluffs the foam. Thus, the thickness of the foam is increased without impairing the bonding of the flexible foam to the backing sheet.

The nature of the invention is further clarified by the accompanying drawing, which is a schematic view of the method in which the flexible foam is fluffed while compressed by a high speed roller having a peripheral speed greater than the forwardly advancing speed of the sheet backed foam.

In the heating zone 9 of an oven 10, a strip of polyurethane sandwich 11 comprising an upper backing sheet 12 and a lower backing sheet 13 is continuously cured subsequent to any of a variety of procedures for manufacturing a flexible polyurethane sandwich. The closed cells of the polyurethane foam tend to shrink as the temperature of the product cools from about 250° F. to about 150° F. during about two seconds during which the sandwich advances about four feet from the oven 10 through a cooling zone 14 toward a pair of power driven rolls 15 and 16 advancing the sandwich at a speed of about 120 feet per minute or 2 feet per second.

A splitting knife 17 cooperates in the splitting of the sandwich into two strips 18 and 19 of sheet-backed polyurethane foam, which strips advance toward the collection reels 20 and 21 respectively. The portion of the method described thus far resembles the descriptions of some previously known procedures for advancing a polyurethane foam sandwich through a splitting zone and onto the two reels for the collection of sheet-backed polyurethane foam.

Particular attention is directed to a zone 22 mechanically expanding the freshly split polyurethane. As the polyurethane foam passes between a pair of rollers 24 and 25, the foam is first compressed and then the resiliency of the flexible foam restores the foam to the expanded state. It should be especially noted that the roller 25 in contact with the polyurethane is driven at a speed which is at least 10% and up to 200% greater than the lineal speed of the advancing strip 18. As the foam is being squeezed between the rolls, and is advancing beyond the squeeze zone, the fast moving roller 25 exerts a force which pulls the foam, whereby the polyurethane foam is stretched to provide a thickness of foam even greater than the thickness prior to passing between the rollers 24 and 25. Although the action of the oven 10 tends to cure the polyurethane, the freshly cut polyurethane has a reactivity such that it tends to adhere tenaciously to a metal surface pushed against it. Although a roller having a lineal speed the same as the lineal speed of the advancing strip of polyurethane foam might not adhere during a few seconds of operation, adhesion difficulties as frequent as at least several times per day must be expected when contacting the freshly cut split foam with a smooth metal roller, having a peripheral speed the same as the forward speed of the strip of backed foam 18. The adhesion difficulties are transformed into advantages, however, by the racing of the roller 25, for the foam is thus induced to be stretched to a greater thickness, whereby the density of the foam is mechanically lessened. Although the pores of the foam leaving the oven tend toward being closed cells, the combination of crushing, compressing and stretching induced by the roller 25 tends to transform the foam into a more completely open cell structure. Possibly because of such change from closed to open cell, possibly because of mechanically initiated chemical interaction within the foam structure, and/or possibly because of other factors, the foam is stabilized satisfactorily as such increased thickness, and can be employed regularly on the basis of such increased thickness. The exact amount of increase of thickness is dependent upon such factors as the formulation for the foam, stiffness of the foam leaving the oven, roughness of the fluffing roll, relative speed of the fluffing roll, magnitude of compression at the fluffing roll, and related phenomena. In actual practice, it was established that a kraft paper having a polyurethane foam layer about 4 mm. thick and a density of about 29 g./l. was transformed by passage through a pair of rollers at a speed of about 2 feet per second, with the fluffing roller revolving at a peripheral speed of 2½ feet per second or about 25% more than the advancing speed of the foam. The compressive weight between the rollers was about 150 pounds for a strip 48 inches wide or about 3 pounds per lineal inch of width of the strip. As a result of this transformation, the polyurethane foam layer was about 5 mm. thick and had a density of about 22 g./l., so that the thickness was increased about 25% and the density was lessened by about 25%.

Not only did the passage through the zone of the racing fluffing roller decrease the density and increase the thickness, but it also greatly improved the tactile qualities and surface finish of the foam. Thus, after the micro-tearing and micro-stretching of the foam, the surface was softer to touch than the freshly split foam. To the extent that polyurethane foam is employed in underclothing, gloves, ear muffs, and related items, such softness is an important advantage of the fluffing process.

Each of the split portions of the sandwich 11 benefits from a fluffing operation. The effectiveness of racing roller 26 in increasing the thickness of the polyurethane foam bonded to backing sheet 13 of the composite strip 19 can be understood as analogous to the fluffing of the strip 18. Similarly an appropriate squeezing force, such as about 3 pounds per inch of width, is exerted between the rollers 26 and 27.

The drawing is schematic inasmuch as the fluffing normally increases the thickness of the polyurethane foam from about 5 to about 40%, but the schematic drawing exaggerates such increase to focus attention upon this surprising and highly advantageous result.

Although the rollers 24 and 25 are shown as being of the same size, such standards are not necessary. For example, the roller contacting the backing sheet 12 might have a diameter several times that of the racing roll 25, and the path of the strip 18 might include contact with such a large diameter roll for an arc such as 180° or 60°, with such large diameter roll driving the paper at the predetermined forward speed of the paper. Without regard to the techniques employed for advancing the strip 18 at its predetermined forward speed, or the techniques for collecting the product upon a reel or other product collector, or the techniques for splitting the flexible foam sandwich, the fluffing procedure of the present invention is highly advantageous.

In some embodiments of the invention, the racing roller 25 in contact with freshly split foam (as well as analogous roller 26) is rough, having a finish analogous to that of a casting in a sand mold, or analogous to the "sand finish" imparted by spraying metal onto an undersize roller. In order to achieve the advantageous fluffing of the present invention, the lineal speed of the roller in contact with the freshly split foam must be within the range from 110% to 300% of the lineal speed of the advancing sheet, that is, the racing or excess speed must be from 10% to 200% of the speed of the advancing strip.

Various modifications of the invention are possible without departing from the scope of the appended claim.

The invention claimed is:

A method of producing an improved laminate comprising a backing sheet with a layer of flexible polyurethane foam bonded thereto which method comprises directing a freshly prepared sandwich structure composed of upper and lower backing sheets and intermediate core of flexible polyurethane foam against a cutting edge to cut therefrom a laminate comprising a backing sheet and freshly cut and adhering foam layer; passing said laminate comprising said backing sheet and freshly cut foam between a first roller contacting said backing sheet and a second roller contacting said freshly cut foam layer, said first and second rollers exerting a compressive force on said laminate and said second roller being operated at a peripheral speed that exceeds the lineal speed of the advancing laminate by from about 10 percent to about 200 percent; and collecting a laminate comprising a backing sheet and adhering layer of flexible polyurethane foam of increased thickness and greater softness than that of the laminate initially cut from the sandwich structure.

References Cited by the Examiner
UNITED STATES PATENTS

| | | | |
|---|---|---|---|
| 1,045,234 | 11/1912 | Willis et al. | 264—321 XR |
| 2,841,205 | 7/1958 | Bird | 264—146 XR |
| 2,961,710 | 11/1960 | Stark | 264—321 |
| 3,006,033 | 10/1961 | Knox | 264—55 |
| 3,012,284 | 12/1961 | Touhey | 264—54 |
| 3,046,177 | 7/1962 | Hankins | 264—47 |
| 3,056,168 | 10/1962 | Terry | 264—55 |
| 3,104,192 | 9/1963 | Hacklander | 264—48 X |

FOREIGN PATENTS 833,416   4/1960   Great Britain.

ALEXANDER H. BRODMERKEL, *Primary Examiner.*